United States Patent [19]

Worick

[11] 4,044,842
[45] Aug. 30, 1977

[54] FLEXIBLE MULTI-SECTION IMPLEMENT

[75] Inventor: Richard A. Worick, Beloit, Kans.

[73] Assignees: Charles W. Fleming; Gerald H. Meier; Milton Rasdall, all of Beloit; William Laas, Salina, all of Kans.

[21] Appl. No.: 594,968

[22] Filed: July 11, 1975

[51] Int. Cl.² .............................................. A01B 5/04
[52] U.S. Cl. .................................. 172/314; 172/395; 172/579; 172/589; 172/595; 172/619; 172/679; 172/776
[58] Field of Search ............... 172/595, 313, 314, 579, 172/776, 395, 619, 623, 624, 627, 629, 580, 581, 584, 588, 596, 677, 679, 310

[56] References Cited

U.S. PATENT DOCUMENTS

| 16,933 | 3/1857 | Morgan | 172/627 |
|---|---|---|---|
| 93,959 | 8/1869 | Brown et al. | 172/627 |
| 150,662 | 5/1874 | Post | 172/627 |
| 400,697 | 4/1889 | Mack | 172/627 X |
| 1,348,830 | 8/1920 | Gillis | 172/629 |
| 3,239,014 | 3/1966 | Oerman et al. | 172/677 X |
| 3,327,787 | 6/1967 | Adee | 172/595 X |
| 3,334,916 | 8/1967 | Tibbals | 172/310 X |
| B 351,535 | 1/1975 | Hendrichon | 172/623 X |

Primary Examiner—Paul E. Shapiro
Attorney, Agent, or Firm—Fishburn, Gold & Litman

[57] ABSTRACT

An implement frame construction includes rigid implement frame sections positioned in side-by-side relation and joined by a linkage system which permits the sections to universally flex within desired limits with respect to each other without substantial variation in lateral spacing therebetween. The linkage preferably includes forwardly and inwardly angled draw tongues vertically pivotally joined to the respective frames and flexibly connecting together in a tractor hitch, a front transverse spacer link extending between the tongues, a rear transverse stabilizing bar having opposite ends pivotally connected to the outer rear end portions of the respective frames, a vertical gag link positioned between the frames and centrally pivotally connected intermediate its ends to one of the frames, a first gag bar connected at its front end to the front inside corner portion of the other frame and at its rear end to one end of the gag link, and a second gag bar pivotally connected at its rear end to the rear inside corner portion of the other frame and at its front end to the other end of the gag link.

9 Claims, 4 Drawing Figures

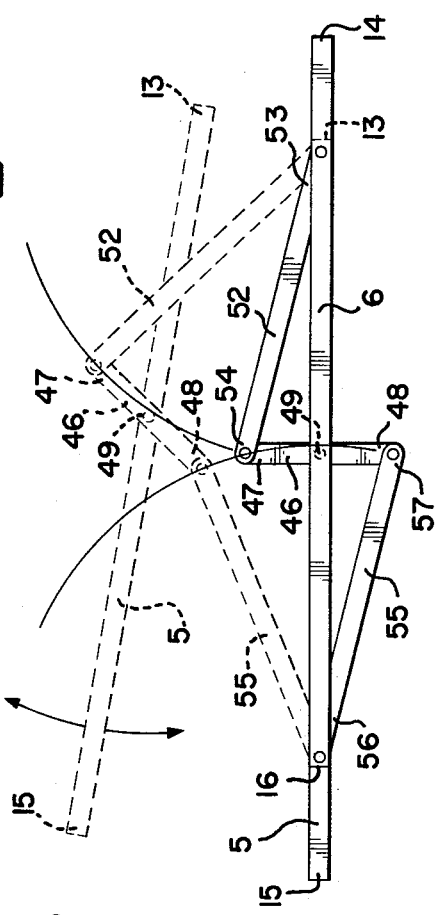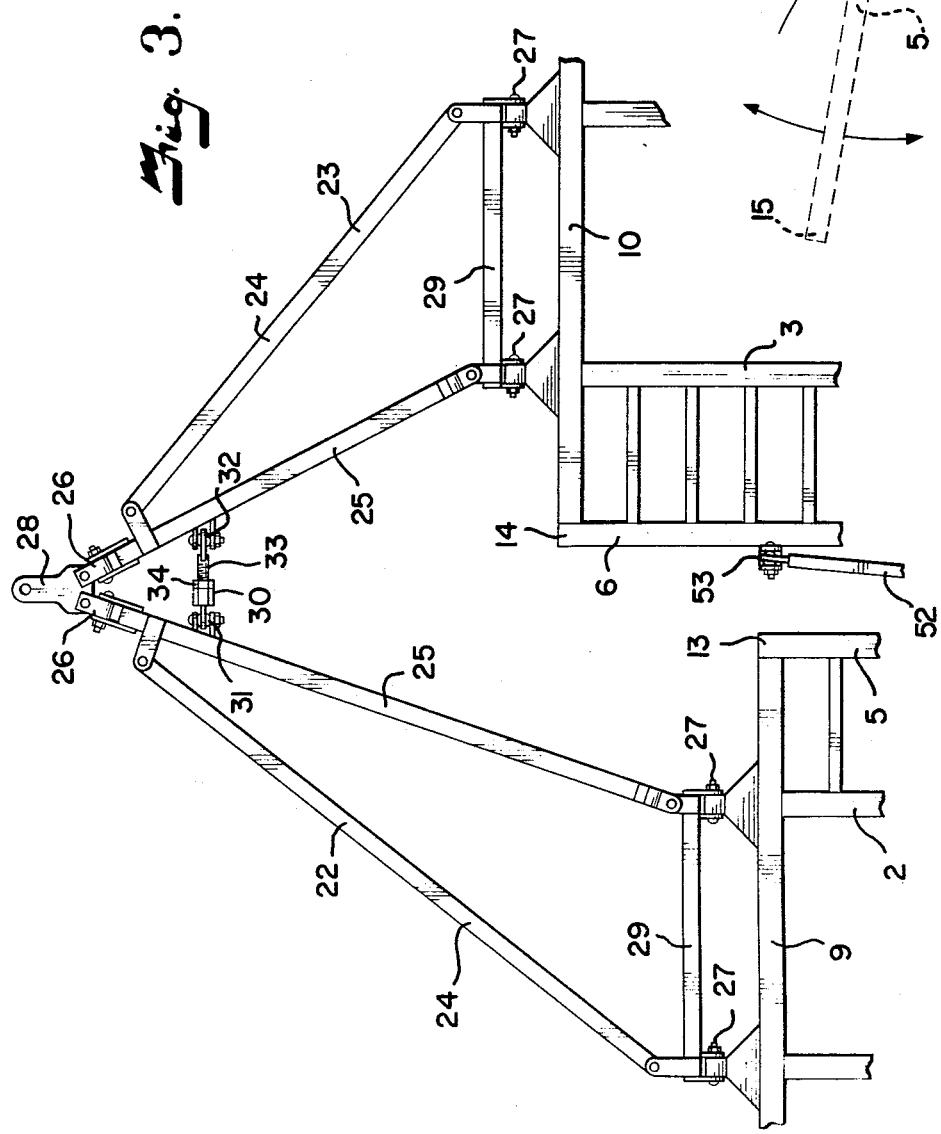

FLEXIBLE MULTI-SECTION IMPLEMENT

This invention relates to agricultural implements and more particularly to tractor drawn tillage implements such as disc harrows and the like.

With the advent of modern, powerful tractors, agricultural implements have been gauged in sections to permit operation over substantially wider paths with equal or increased speed, thereby greatly reducing the functional time necessary in the field. Chain type gauging, where implements are offset both laterally and rearwardly, present problems in turning, furrow spacing and rear section oscillations, although reasonably uniform cutting depth may be maintained over ground swells, terraces, ridges and the like. Side-by-side sections which are hinged together are easier to turn, avoid rear section oscillations, and produce even furrow spacing, but tend to cause non-uniform cutting depth along the path due to limited freedom of relative movement over rough ground. Without the restrictions of such hinges, however, there is a pronounced tendency of the side-by-side sections to wander laterally, producing severely non-uniform spacing in the furrows and sometimes damaging contact with each other.

By the practice of this invention, side-by-side implement frame sections are individually permitted to universally flex within desired limits, without substantial variation in the lateral spacing therebetween, thereby providing the best overall performance. This is accomplished through the use of gag and stabilizer linkages which permit both side-to-side and front-to-back flexibility without permitting the units to move out of the desired lateral or vertical relationship with each other.

The principal objects of the present invention are: to provide an implement frame construction by which laterally positioned independent frame sections are maintained in desirable relationship with each other without interfering with the independent flexibility necessary for following ground contours; to provide such a frame construction which efficiently accepts hinged outer wing sections on respective linked central frame sections; to provide a disc harrow frame construction which produces uniform tillage over a wide path with minimal apparatus length; to provide such an arrangement which allows the tillage tool carrying frames to be pulled from the assembly center with balanced draft; to provide a multi-section tillage arrangement which may be easily disassembled, whereupon the separate sections are usuable with smaller tractors; and to provide such an implement frame arrangement which is relatively simple and inexpensive in construction, long lived, and extremely well adapted for its intended purpose.

Other objects and advantages of this invention will become apparent from the following description taken in connection with the accompanying drawings wherein are set forth by way of illustration and example certain embodiments of this invention.

FIG. 3 is a fragmentary plan view showing details of the draw tongue assembly.

FIG. 4 is a schematic representation of the central gag linkage movement, shown distorted and exaggerated for illustration.

Figure 1:
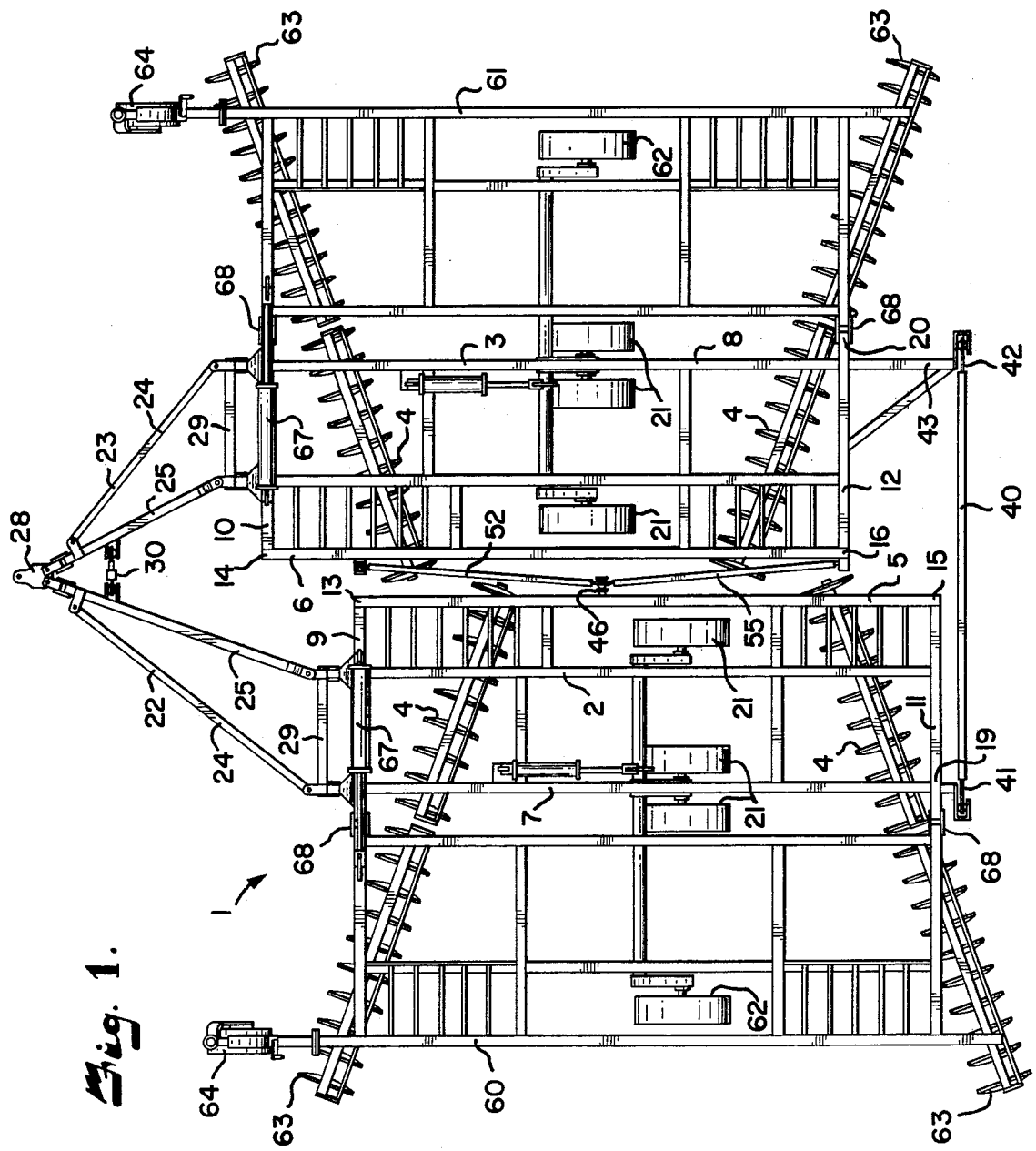
FIG. 1 is an overall plan view illustrating a foursection disc harrow embodying this invention.

Referring to the drawings in more detail:

The reference numeral 1 generally indicates a disc harrow frame construction embodying this invention. The construction 1 comprises a left, rigid, horizontal frame section 2 and a right, rigid, horizontal frame section 3 respectively positioned in generally side-by-side or lateral relation, but slightly longitudinally offset. Tillage tools, in this example, spaced rows of harrow discs 4 depend from the respective frame section in a pattern whereby furrow spacing is uniform over the entire path width when the frame sections are maintained in predetermined lateral positions.

The frame sections 2 and 3 respectively include inner elongated longitudinal structural beam 5 and 6 and outer elongated longitudinal structural beams 7 and 8. The respective left and right sections 2 and 3 also have front elongated transverse beams 9 and 10 and rear transverse beams 11 and 12. The beams 5, 7, 9 and 11 of the left section 2 and the beams 6, 8, 10 and 12 of the right section 3 are respectively suitably fixed with respect to each other, as by welding, forming on the respective frame sections, inner front corners 13 and 14, inner rear corners 15 and 16, outer front corners 17 and 18, and outer rear corners 19 and 20. Appropriate braces and interconnecting structural members add rigidity to the frame sections and provide anchoring points for wheel axles, tillage tools, hydraulic cylinders, etc.

Vertically adjustable wheels 21 are suitably mounted on the respective frame sections 2 and 3 and normally support same for rolling forward horizontal movement above the ground with the harrow discs at ground cutting depth.

Elongated forwardly and inwardly angled draw tongues 22 and 23 are provided for each of the frame sections 2 and 3 and respectively comprise outer and inner rigid bars 24 and 25 which form acute angles with respect to each other and are joined near the front ends thereof in vertically pivotal anchors 26. Vertically pivotal joint members 27 connect the rear ends of the draw tongue bars to the respective front transverse beams 9 and 10, permitting the draw tongues 22 and 23 to pivot vertically with respect to the frame sections 2 and 3. A tractor hitch clevis 28 is connected to the front ends of the respective draw tongues 22 and 23 forming a common draw point for both the sections 2 and 3 and which is located forwardly and generally centrally thereof.

The rigidity of respective draw tongues 22 and 23 is increased by a base bar 29 which connects the rear ends of the bars 24 and 25 to produce a structural triangle shape. A front transverse spacer link 30 has ball joints 31 and 32 at opposite ends thereof and which are connected respectively to the inner bars 25 of the draw tongues 22 and 23 intermediate the tongue ends. The spacer link 30 is suitably adjustable in length by means of a threaded section 33, cooperating with a lock nut 34, whereby the lateral distance between the inner front corners 13 and 14 may be adjusted and generally fixed without interfering with the ability of said inner front corners to move upwardly generally independently of each other.

Figure 2:
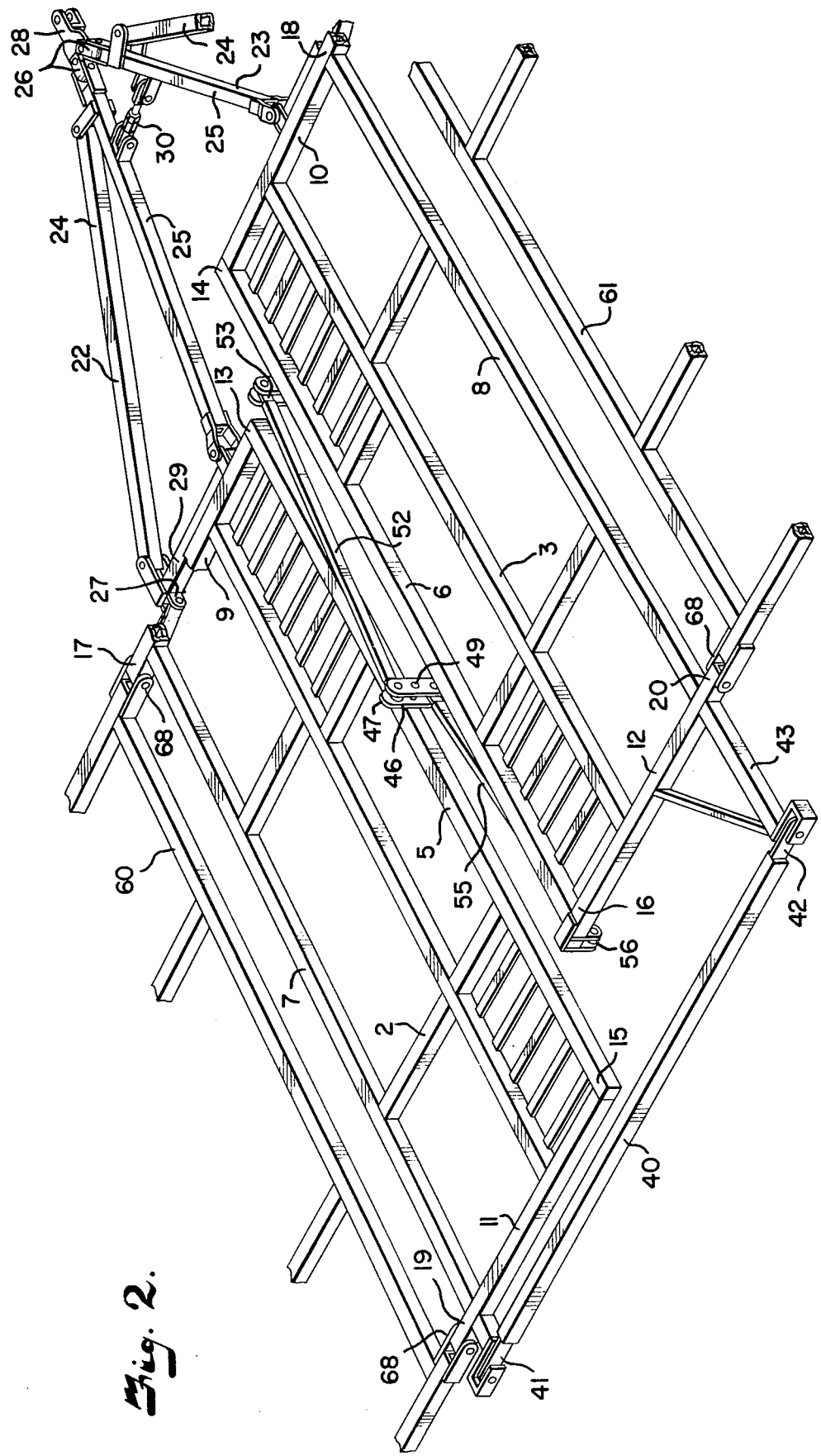
FIG. 2 is a fragmentary perspective view on a larger scale particularly showing the gag and stabilizing linkages with respect to laterally positioned center frame sections.

An elongated rear transverse stabilizing bar 40 has opposite ends 41 and 42 and extends generally parallel to the rear transverse beams 11 and 12. The stabilizing bar ends 41 and 42 are respectively vertically pivotally connected by ball joints to the frame sections 2 and 3 near the rear outer corners 19 and 20 as best seen in FIG. 2, the end 42 in this example requiring a braced frame extension 43. The stabilizing bar 40 is spaced rearwardly of the rear beam 11 and 12 permitting vertical relative rocking motion without physical contact therewith except at the ends 41 and 42.

A gag link 46 has an upper end 47, a lower end 48 and a central mount 49 therebetween. The gag link 46, in this example, is positioned generally between the frame sections 2 and 3 and is pivotally engaged at the central mount 49 to one of the inner section beams, in this example the left section inner beams 5, intermediate the front and rear inner corners 13 and 15 thereof. As illustrated, the gag link 46 is pivotable in a vertical plane between the generally horizontally extending frame sections 2 and 3.

A first gag bar 52 has a forward end 53 pivotally connected to the other of the inner beams, in this example beam 6, near the front inner corner 14 for vertical movement with respect thereto. The rear end 54 of the first gag bar 52 is pivotally connected to one of the gag link ends, in this example the upper end 47. A second gag bar 55 is located rearwardly of the gag bar 52 and has its rear end 56 pivotally connected to the same inner beam 6 near the rear inner corner 16. The front end 57 of the second gag bar 55 is also pivotally connected to the gag link but at the end opposite to that of the first gag bar 52, in this example the lower end 48. The connections at the ends of the gag bars 52 and 55 are ball joints to permit some lateral displacement between the frame sections 2 and 3 with relative vertical movement.

Outer frame sections 60 and 61 are supported by suitable adjustable wheels 62 and are respectively hinged to the outer longitudinal structural beams 7 and 8, whereby the respective outer frame sections may pivot upwardly and inwardly over the central frame sections 2 and 3. The outer frame sections 60 and 61 relatively have additional tillage tools depending therefrom, in this example harrow discs 63 which operate in the same manner as the more centrally located discs 4. Corner wheels 64 are provided at the front outer corners of the outer frame sections 60 and 61 to limit the depth of discing at the leading outer corner where "digging in" is most likely to be experienced.

Suitable hydraulic rams 67 are pivotally mounted between the central frame sections 2 and 3 and their respective outer frame sections 60 and 61 for selectively lifting the outer frame sections about the hinge point 68 when it is necessary to decrease the width of the implement for passing through fence gates, road travel, etc.

In operation, the outer frame sections 60 and 61 are folded to the horizontal position shown in FIG. 1 and the entire apparatus is pulled forwardly by a tractor connected to the hitch clevis 28. The outer frame sections 60 and 61 are permitted to freely pivot about the hinge points 68 thereby providing partial compensation for following uneven terrain. The major compensation, however, is accomplished by means of the interaction of the flexible draw tongues 22 and 23, rear stabilizer bar 40 and gag linkage members 52, 46 and 55. The freedom of the various members to pivot allows the respective frame sections 2 and 3 to move with respect to each other in rolling about the longitudinal dimension, pitching about the transverse dimension and elevation variations, allowing universal relative flexing within the limits permitted by the restricting influence of the gag linkage members, but all without substantial variation in the lateral spacing therebetween. Note in FIG. 4 where the broken lines illustrate schematically the inner beam 5 displaced in both elevation and pitch from the inner beam 6.

The relative movement permits more uniform tillage with a minimum of draw bar force even over relatively rough and rolling terrain. The short length of the apparatus for the operating path width is instrumental in allowing conveniently short turns, relatively easy handling and hook-up and convenient storage. If a tractor powerful enough to pull the whole assembly is not available, the respective left and right sections may be easily separated by disconnecting the appropriate linkage members, producing two fully functional tillage sections which may be respectively pulled by available smaller tractors.

It is to be understood that the hinged wing sections produce the maximum advantages in the practice of this invention, however, the central sections 2 and 3 without such wings are fully functional for tillage and without departing from the scope of the invention.

It is to be further understood that while certain forms of this invention have been illustrated and described, it is not to be limited thereto except insofar as such limitations are included in the following claims.

What is claimed and desired to secure by Letters Patent is:

1. An implement frame construction comprising:
  a. left rigid horizontal frame section and a right rigid horizontal frame section positioned in generally side-by-side relation, tillage tools depending from said frame sections, said frame sections respectively including inner and outer elongated longitudinal structural beams and front and rear elongated transverse beams welded together and forming front and rear inner and outer frame section corners;
  b. vertically adjustable wheels mounted on said respective frame sections and supporting same for forward horizontal movement along the ground;
  c. an elongated forwardly and inwardly angled draw tongue for each of said frame sections, pivotal joint members connecting the rear ends of said draw tongues to said respective front transverse beams and permitting said draw tongues to pivot vertically, a tractor hitch clevis flexibly connected to the front ends of said draw tongues and forming a common generally central draw point for said frame sections;
  d. a front transverse spacer link having ball joints at opposite ends, said last named ball joints being connected respectively to said draw tongues intermediate said tongue ends, an elongated rear transverse stabilizing bar having opposite ends and extending generally parallel to said rear transverse beams, said rear bar ends being vertically pivotally connected to said frame sections near said respective rear outer corners;
  e. a gag link having an upper end and a lower end and a central mount therebetween, said gag link being positioned generally between said frame sections and pivotally engaged at said central mount with one of said inner beams intermediate said front and rear inner corners, a first gag having a forward end pivotally connected to the other of said inner beams near said front inner corner, said first gag bar having a rear end pivotally connected to one of said gag link ends, a second gag bar having a rear end pivotally connected to said other inner beam near said rear inner corner, said second gag bar having a front end pivotally connected to the other of said gag link ends;

f. whereby said frame sections are permitted to universally flex with respect to each other without substantial variation in lateral spacing therebetween.

2. The implement frame construction as set forth in claim 1 wherein:
   a. said draw tongues are rigid triangular structures having inner and outer bars,
   b. said spacer link being connected between said inner bars.

3. In an implement frame construction having a left rigid horizontal frame section and a right rigid horizontal frame section positioned in generally side-by-side relation and tillage tools carried by said frame section:
   a. linkage members connected said frame sections together for relative movement therebetween in rolling and pitching but without substantial variation in lateral spacing,
   b. said linkage members including a gag linkage arrangement including a gag link pivotally mounted on one of said frame sections;
   c. said gag link having an upper end and a lower end and a central mount therebetween, said gag link being positioned generally between said frame sections and pivotally engaged at said central mount with said one of said frame sections;
   d. said gag linkage arrangement further including a first gag bar having a forward end pivotally connected to the other of said frame sections, said first gag bar having a rear end pivotally connected to one of said gag link ends; and
   e. a second gag bar having a rear end pivotally connected to the other of said frame sections, said second gag bar having a front end pivotally connected to the other of said gag link ends.

4. An implement frame construction comprising:
   a. a left rigid horizontal frame section and a right rigid horizontal frame section positioned in generally side-by-side relation, tillage tools mounted on said frame sections, said frame sections respectively including inner and outer longitudinal structural members and front and rear transverse members secured together;
   b. wheels mounted on said respective frame sections and supporting same for forward horizontal movement along the ground;
   c. a draw tongue for each of said frame sections and having front ends and rear ends, pivotal joint members connecting the rear ends of said draw tongues to said respective front transverse members, a tractor hitch flexibly connected to the front ends of said draw tongues and forming a common generally central draw point for said frame sections;
   d. a rear transverse stabilizing bar having opposite ends pivotally connected to said frame sections near said respective rear transverse members;
   e. gag linkage operably connected between said inner longitudinal structural members, said gag linkage including;
   f. a gag link having an upper end and a lower end and a central mount therebetween, said gag link being positioned generally between said frame sections and pivotally engaged at said central mount with one of said inner structural members;
   g. a first gag bar having a forward end pivotally connected to the other of said inner structural members near said front members, said first gag bar having a rear end pivotally connected to one of said gag link ends; and
   h. a second gag bar having a rear end pivotally connected to the other structural member near said rear members, said second gag bar having a front end pivotally connected to the other of said gag link ends,
   i. whereby said frame sections are permitted to flex with respect to each other over more than one degree of freedom without substantial variation in lateral spacing therebetween.

5. The implement frame construction as set forth in claim 4 including:
   a. a tillage tool carrying wing frame hinged to each of said frame sections at said outer structural members.

6. The implement frame construction as set forth in claim 4 wherein:
   a. said tillage tools are harrow discs.

7. The implement frame construction as set forth in claim 4 wherein:
   a. the pivotal connections of said gag linkage are ball joints.

8. The implement frame construction as set forth in claim 4 wherein:
   a. said draw tongues are rigid triangular structures.

9. An implement frame construction comprising:
   a. a left rigid horizontal frame section positioned in tenerally side-by-side relation, tillage tools mounted on said frame sections, said frame sections respectively including inner and outer longitudinal structural members and front and rear transverse members secured together;
   b. wheels mounted on said respective frame sections and supporting same for forward horizontal movement along the ground;
   c. a draw tongue for each of said frame sections and having front ends and rear ends, pivotal joint members connecting the rear ends of said draw tongues to said respective front transverse members, a tractor hitch flexibly connected to the front ends of said draw tongues and forming a common generally central draw point for said frame sections;
   d. a rear transverse stabilizing bar having opposite ends pivotally connected to said frame sections near said respective rear transverse members;
   e. gag linkage operably connected between said inner longitudinal structural members; and
   f. a front transverse spacer link having pivotal connections at opposite ends, said last named pivotal connections being engaged respectively to said draw tongues intermediate said tongue ends;
   g. whereby said frame sections are permitted to flex with respect to each other over more than one degree of freedom without substantial variation in lateral spacing therebetween.

* * * * *